United States Patent [19]

Torii

[11] Patent Number: 5,083,808
[45] Date of Patent: Jan. 28, 1992

[54] TOWING TRACTOR

[75] Inventor: Yasuhiro Torii, Kariya, Japan

[73] Assignee: Kabushiki Kaisha Toyoda Jidoshokki Seisakusho, Kariya, Japan

[21] Appl. No.: 710,238

[22] Filed: Jun. 3, 1991

Related U.S. Application Data

[63] Continuation of Ser. No. 469,252, Jan. 24, 1990, abandoned.

[30] Foreign Application Priority Data

Jan. 25, 1989 [JP] Japan .................................. 1-15689

[51] Int. Cl.⁵ .............................................. B60D 1/26
[52] U.S. Cl. .................................... 280/507; 280/508; 280/515
[58] Field of Search .............. 280/477, 500, 501, 504, 280/506, 507, 508, 515, 400

[56] References Cited

U.S. PATENT DOCUMENTS

| | | | |
|---|---|---|---|
| 2,579,232 | 12/1951 | Hansen | 280/515 |
| 2,996,126 | 8/1961 | Voegeli | 280/477 |
| 3,856,331 | 12/1974 | Bogdanovich | 280/515 |

FOREIGN PATENT DOCUMENTS

| | | |
|---|---|---|
| 54-5212 | 1/1979 | Japan . |
| 56-71405 | 6/1981 | Japan . |
| 59-24565 | 7/1984 | Japan . |
| 63-202507 | 12/1988 | Japan . |
| 64-37707 | 3/1989 | Japan . |
| 1-95404 | 6/1989 | Japan . |

Primary Examiner—Charles A. Marmor
Assistant Examiner—Anne M. Boehler
Attorney, Agent, or Firm—Brooks Haidt Haffner & Delahunty

[57] ABSTRACT

A draw bar for a towing tractor includes a draw bar bracket mounted on a weight of the towing vehicle, a draw bar pin provided for axial movement in an insertion opening in the draw bar bracket, an actuating lever provided near a driver's seat of the towing tractor, and a link unit interconnecting the actuating lever and the draw bar pin for shifting the draw bar pin on actuation of the actuating lever. The link unit is provided in the weight through an opening formed in the vicinity of the draw bar bracket of the weight and an opening formed in the vicinity of the actuating lever.

3 Claims, 3 Drawing Sheets

FIG. I
PRIOR ART

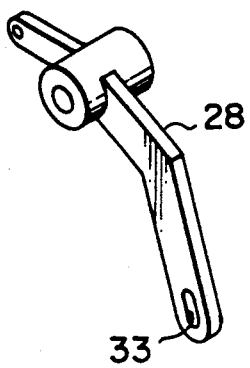
FIG. 5
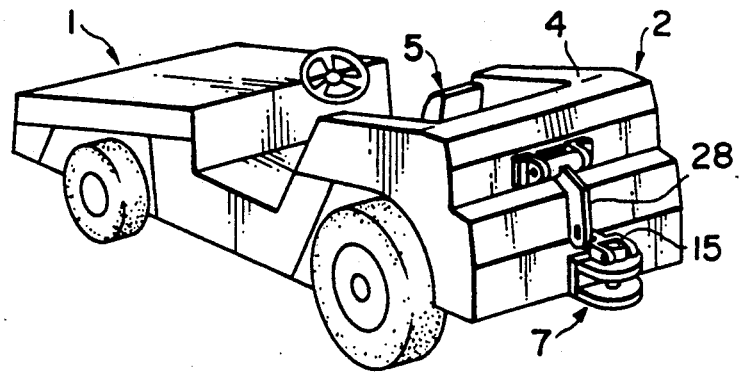
FIG. 6
FIG. 7
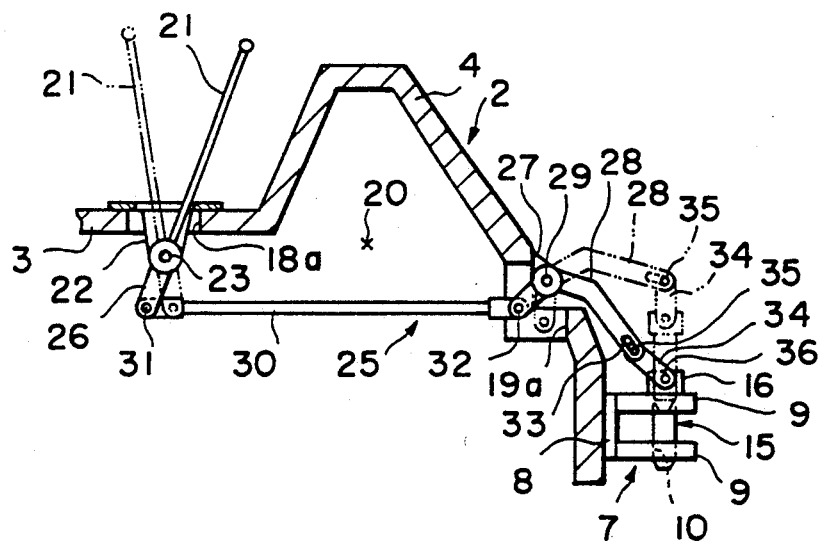
FIG. 8
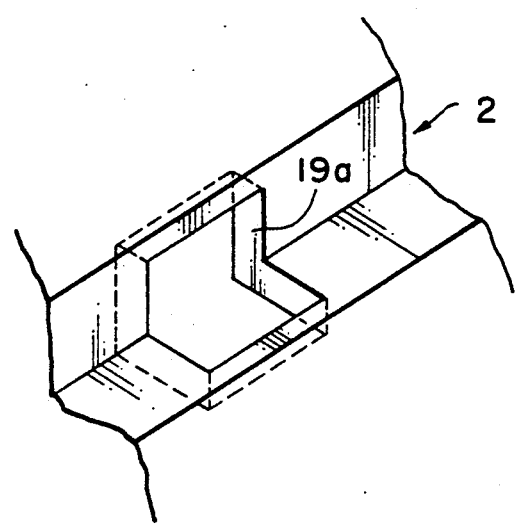

5,083,808

TOWING TRACTOR

This application is a continuation of application Ser. No. 07/469,252, filed Jan. 24, 1990 now abandoned.

BACKGROUND OF THE INVENTION

1. Field of the Invention

This invention relates to a draw bar for a towing tractor employed in a towing operation for an aircraft or a trailer.

2. Prior Art

An example of a conventional draw bar for a towing tractor is shown in FIG. 1. This draw bar is constituted by a draw bar bracket 7 mounted on a weight 2 at the rear of the towing tractor, a draw bar pin is provided for vertical movement in an insertion opening 10 of the draw bar bracket 7, an actuating lever 21 provided near a driver's seat 5 of the towing tractor, and a link unit 25 linking the actuating lever 21 to the draw bar pin 15 and adapted for raising or lowering the draw bar pin 15 on actuation of the lever 21.

The actuating lever 21 is pivotally mounted on a lever bracket 27 on the weight 2 by the interposition of a lever shaft 23. The link unit 25 is constituted by a link 28 secured to the proximal end of the actuating lever 21 and a link 34 having its one end provided with a connecting pin 35 engaging in an elongated aperture 33 at the end of the link 28 and having its other end rotatably mounted on a head 15a of the draw bar pin 15 by the interposition of a pin 36.

When the actuating lever 21 is rotated from the solid line position to the double dotted chain line position, with the link 28 being rotated in the same direction as the actuating lever 21, the draw bar pin 15 is raised to a receded or out-of the-way position by means of the link plate 34. For towing a trailer, for example when the actuating lever 21 is rotated to its original position, with a connecting opening 13 in a tow bar 12 of the trailer being aligned with the insertion opening 10 of the draw bar bracket 7, the draw bar pin 15 is lowered by its own gravity to the towing position to inter-connect the tow bar 12 to the draw bar bracket 7.

With the above described conventional draw bar, the link unit is arranged in the exposed state on the outside of the weight.

Therefore, during rearward movement of the towing tractor, it frequently occurs that the link unit impinges on some impediment or member to be thereby damaged. Also the link unit exposed on the outside of the weight detracts from the appearance of the towing tractor to impair neatness in design.

A protective cover for the link unit may be annexed to the weight to prevent the above mentioned damage to the weight. However, this again is not a desirable measure since the protective cover similarly detracts from the appearance of the towing tractor.

OBJECT AND SUMMARY OF THE INVENTION

It is a principal object of the present invention to provide a draw bar for a towing tractor wherein damage to the link unit by an obstacle or the like may be prevented without detracting from the appearance of the towing tractor.

According to the present invention, there is provided a draw bar for a towing tractor comprising a draw bar bracket mounted on a weight of the towing tractor, a draw bar pin provided for axial movement in an insertion opening in said draw bar bracket, an actuating lever provided near a driver's seat of the towing tractor, and a link unit interconnecting said actuating lever and the draw bar pin for shifting said draw bar pin on actuation of said actuating lever, said link unit being provided in said weight through an opening formed in the vicinity of the draw bar bracket of said weight and an opening formed in the vicinity of the actuating lever.

With the above described arrangement of the present invention, the weight of the towing tractor substantially covers the link unit interconnecting the actuating lever and the draw bar pin and functions as a protective cover for the link unit. Thus damage otherwise inflicted on the link unit by an obstacle or the like may be prevented without detracting from the appearance of the towing tractor.

BRIEF DESCRIPTION OF THE DRAWINGS

FIGS. 2 to 6 illustrate a first embodiment of the present invention, wherein FIG. 2 is a side elevational view of a draw bar of a towing tractor, partly broken away.

FIG. 2 is a perspective view showing an attachment portion of the proximal end of the actuating lever.

FIG. 4 is a perspective view showing an attachment portion of a link lever.

FIG. 5 is a perspective view showing a link lever.

FIG. 6 is a perspective view of the towing tractor from the rear side.

FIGS. 7 and 8 illustrate a second embodiment of the present invention, wherein FIG. 7 is a side elevational view of a draw bar of a towing tractor, partly broken away.

FIG. 8 is a perspective view of the rear part of the weight.

DESCRIPTION OF PREFERRED EMBODIMENTS

Figure 1:
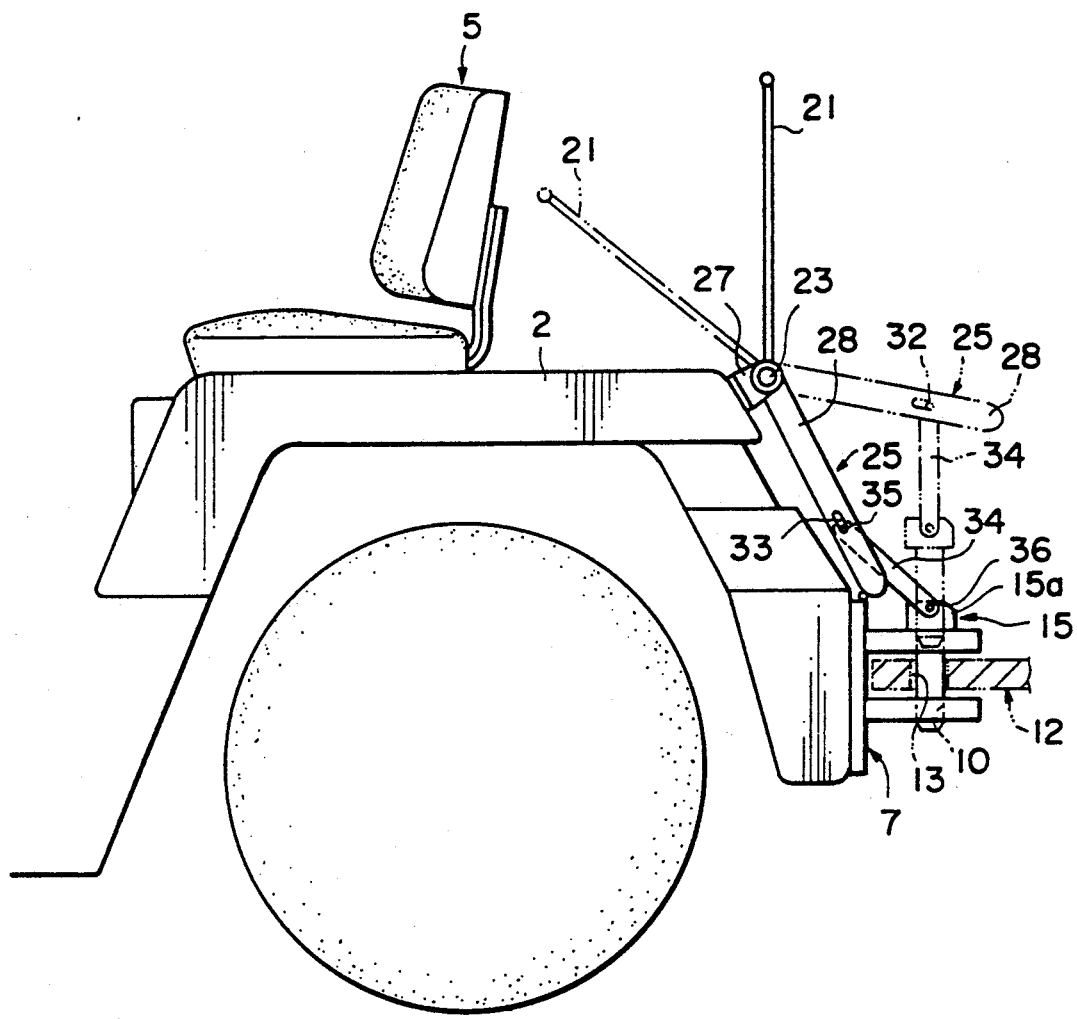
FIG. 1 is a side elevational view of a draw bar of the conventional towing tractor.
Figure 2:
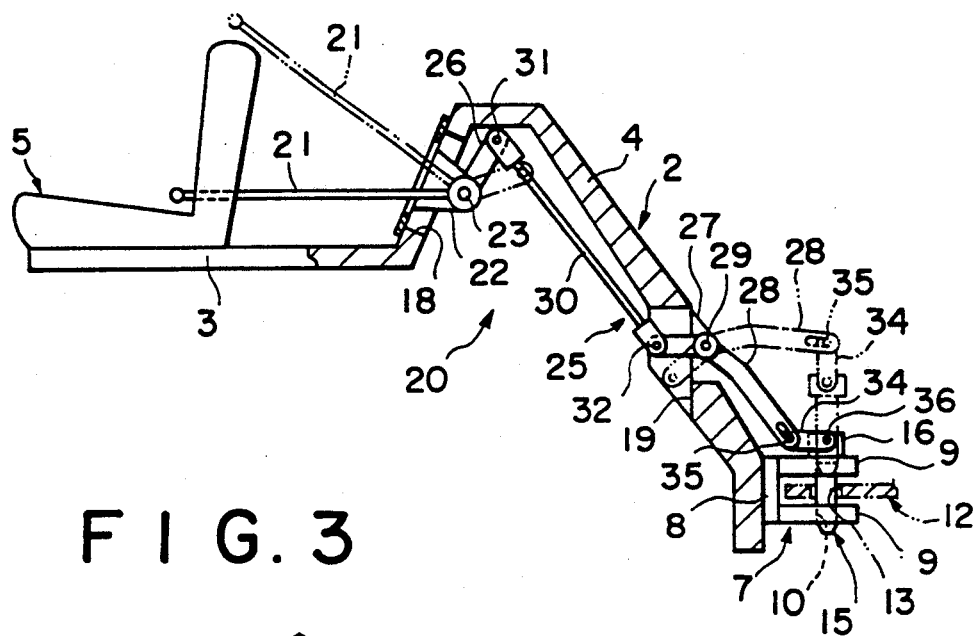

By referring to FIGS. 2 to 6, a first embodiment of the present invention will be explained in detail. The parts or components which are the same as or equivalent to those of the conventional device of FIG. 1 are indicated by the same reference numerals. In FIG. 6, showing the towing tractor in a rear perspective view, and in FIG. 2, showing the draw bar of the towing tractor in a side elevational view, a towing tractor 1 is provided at its rear with a weight 2. The weight 2 includes a floor section 3, on the upper surface of which a driver's seat is provided, and an enclosure 4 having an angled cross-section and surrounding the rear and both lateral sides of the driver's seat 5.

A draw bar bracket 7 is attached to the rear side of the weight 2. The draw bar bracket 7 has its upper and lower connecting plates 9 secured in parallel to a mounting plate 8 in turn secured in the weight 2. The two connecting plates 9 are provided with aligned openings 10,10. A tow bar 12 provided on a trailer or the like and having a connecting opening 13 is interposed between the connecting plates 9.

A draw bar pin 15 is inserted into and through the opening 10 of the draw bar bracket 7 from above for movement vertically or axially. The draw bar 15 has its head 16 resting on the edge of the opening 10 of the upper connecting plate 9.

The enclosure 4 of the weight 2 is formed with a front opening 18 which is positioned back of the driver's seat 5. The rear side of the weight 2 is formed with a rear opening 19 above the vicinity of the draw bar bracket 7. These openings 18, 19 communicate with each other by way of an interior section 20 in the weight 2.

An actuating lever 21, arranged back of the driver's seat 5, has its proximal end inserted into the front side opening 18 in the weight 2, and is rotatably mounted by means of a lever shaft 23 on a lever brackets 22 secured at the front opening 18. The actuating end of the actuating lever 21 is directed to the front side of the vehicle and mounted laterally of the driver's seat 5 (FIG. 2).

Figure 3:
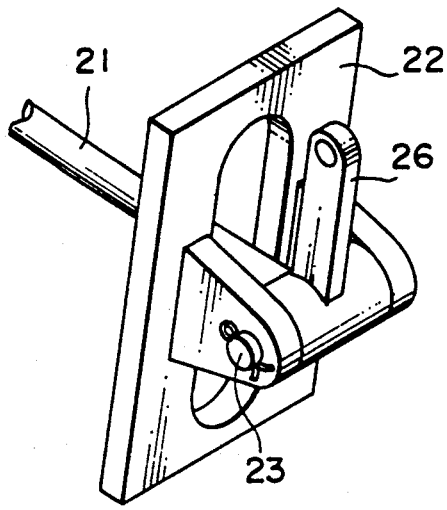
Figure 4:
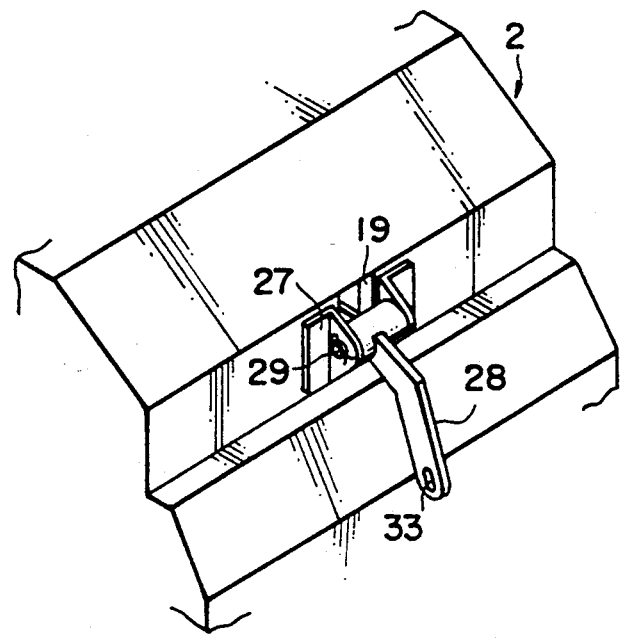

A link unit 25 interconnecting the actuating lever 21 and the draw bar 15 is explained in detail. A link 26 is secured to the proximal end of the actuating lever 21 (FIG. 3). At the rear opening 19 of the weight 2 is secured a link lever bracket 27 to which a link lever 28 is pivotaly mounted at the central portion thereof by means of a shaft 29 (FIGS. 4 and 5). The fore and aft ends of a connecting rod 30 are rotatably connected to the end of the link 26 and to the forward end of the link lever 28 by means of shafts 31, 32, respectively. The rear end of the link lever 28 has an elongated opening 33 in which a connecting pin 35 provided at one end of a link plate 34 is engaged rotatably and slidably. The link plate 34 has its other end rotatably mounted on the head 16 of the draw bar pin by means of a pin 36.

In the above described draw bar of the present embodiment, when the actuating lever 21 is rotated from the solid line position to the double dotted chain line position in FIG. 2, with the link lever 28 being rotated by means of the connecting rod 30 of the link unit 25 in the opposite direction to the actuating lever 21, the draw bar pin 15 is raised to the receded or out-of-the-way position by way of the link plate 34. This leaves the space between the two connecting plates 9 of the draw bar bracket 7 open.

For towing the trailer, the tow bar 12 of the trailer is inserted into the space between the connecting plates 9 of the draw bar bracket 7. When the actuating lever 21 is returned to its original position, with the connecting opening 13 in the tow bar 12 being aligned with the opening 10 in the draw bar bracket 7, the draw bar pin 15 descends by its own gravity to the towing position to interconnect the tow bar 12 to the tow bar bracket 7.

With the above described draw bar of the towing tractor, the link unit 25 interconnecting the actuating lever 21 and the draw bar pin 15 is substantially covered by the weight 2, which functions as a protective cover for the link unit 25.

With the link unit 25 thus protected by the weight 2, the link unit 25 may be prevented from being damaged by obstacles. Since the weight 2 is utilized as the protective the link unit or a separate cover is provided above the weight 2.

In the present embodiment, since the actuating lever 21 is provided on the lateral side of the driver's seat 5 and along the floor section 3 of the weight 2, the driver's back view is not obstructed by the actuating lever 21.

When a cabin of the driver's seat 5 is mounted by taking advantage of the enclosure 4 of the weight 2, the actuating lever 21 is not obstrusive in mounting the cabin, while the actuating lever 21 may be actuated within the cabin.

With the use of the link unit 25 constituted by the link lever 28, the connecting rod 30 and the link plate 34, the lever length on the side of the link plate 34 of the link lever 28 may be shorter than that of the conventional draw bar. In this manner, the risk that the operator taking charge of connection of the tow bar 12 for towing the trailer should contact with the link lever 28 may be minimized.

SECOND EMBODIMENT

A second embodiment of the present invention will be explained by referring to FIGS. 7 and 8. In consideration that the rotational actuation of the actuating lever 21 in the above described first embodiment is opposite to that of the lever in the conventional draw bar, the arrangement of the link unit 25 is modified in the present embodiment so that the actuating lever 21 may be actuated in the same direction as that of the conventional lever. In the present second embodiment, the parts or components similar to those of the first embodiment are indicated by the same numerals and the corresponding description is not made for simplicity.

Referring to FIG. 7, which is a side elevational view of a draw bar of a towing tractor, with a portion thereof being cut away, the lever bracket 22 of the actuating lever 21 is mounted at the front opening 18a in the floor section 3 of the weight 2, with the actuating end of the actuating lever 21 directed upwards.

The weight 2 has a rear opening 19a which is in the shape of the letter L in cross-section (FIG. 8) to permit the end towards the connecting rod 30 of the link lever 28 to be pivoted in the fore and aft direction.

With the above described draw bar of the towing tractor 1, the operation is similar to that achieved with the first embodiment, while the operation of the actuating lever 21 remains the same as with the conventional system, so that the operator accustomed to the operation on the conventional towing tractor may actuate the draw bar without any strange feeling.

What is claimed is:

1. A draw bar assembly on a towing tractor having a tractor body with a rearward facing wall portion that extends across the rear of the tractor and upward for a given distance to a point where it is joined to a second wall portion that faces forward and extends downward to a substantially horizontal wall portion on which is mounted a seat for a driver which seat is spaced forwardly a short distance from said second wall portion, said rearward facing wall portion in cooperation with said second wall portion enclosing an underlying space therebetween, said draw bar assembly comprising in combination: a first aperture formed in said rearward facing wall portion, a second aperture formed in one of said other wall portions rearwardly of said seat, an actuating lever, a pivot member disposed within said underlying space adjacent said second aperture and pivotally mounting said actuating lever with one end of said lever extending through said second aperture so as to be within reach of a driver when seated in said seat, a link lever, link lever mounting means joined to said rearward facing wall portion adjacent said first aperture, said link lever having first and second ends, an intermediate pivot point, and being disposed passing through said first aperture with its first end within said underlying space, its second end external to said tractor body, and its pivot point pivotally mounted on said link lever mounting means, a connecting rod, means articulatably joining opposite ends of said connecting rod respectively to said actuating lever and said first end of said link lever, a draw bar pin, rigid means suspending said draw bar pin from said second end of said link lever for positive vertical movement of said draw bar pin between a raised unlocking position and a lowered locking position responsive to movement of said actuating lever, a clevis-like draw bar mounted below said link lever on an exterior surface of said rearward facing wall portion with arms disposed one above the other each with an aperture on a common vertical axis for receiving said draw bar pin therethrough when said draw bar pin is in said lowered position, and said draw bar is constructed to receive the eye of a tow bar between its arms where said draw bar pin can pass through said eye when lowered to said locking position.

2. A draw bar assembly for a towing tractor according to claim 1, wherein said connecting rod is disposed substantially parallel to said rearward facing wall portion.

3. A draw bar assembly for a towing tractor according to claim 1, wherein said connecting rod is disposed in a substantially horizontal position.

* * * * *